United States Patent
Uemura et al.

[11] Patent Number: 6,028,695
[45] Date of Patent: Feb. 22, 2000

[54] OPTICAL MODULATING APPARATUS

[75] Inventors: Aritomo Uemura; Takashi Mizuochi; Katsuhiro Shimizu; Kiwami Matsushita; Tadayoshi Kitayama; Masatoshi Suzuki; Hidenori Taga; Shu Yamamoto, all of Tokyo, Japan

[73] Assignee: Mitsubishi Denki Kabushiki Kaisha, Tokyo, Japan

[21] Appl. No.: 09/124,993

[22] Filed: Jul. 30, 1998

[30] Foreign Application Priority Data

Aug. 8, 1997 [JP] Japan ................................ 9-213777

[51] Int. Cl.$^7$ ............................ G02F 1/035; G02F 1/055
[52] U.S. Cl. ...................... 359/279; 359/181; 359/183; 359/276; 385/3
[58] Field of Search ........................ 385/2, 3; 359/181, 359/183, 276, 279

[56] References Cited

U.S. PATENT DOCUMENTS

| 5,408,544 | 4/1995 | Seino ........................................... 385/3 |
| 5,477,375 | 12/1995 | Korotky et al. ........................ 359/264 |
| 5,515,196 | 5/1996 | Kitajima et al. ........................ 359/180 |

FOREIGN PATENT DOCUMENTS

| 6-021889 | 1/1994 | Japan . |
| 9-236781 | 9/1997 | Japan . |

OTHER PUBLICATIONS

Pulse Generation for Soliton Systems Using Lithium Niobate Modulators IEEE Journal of Selected Topics in Quantum Electronics, vol. 2, No. 2, Jun. 1996.

*Primary Examiner*—Georgia Epps
*Assistant Examiner*—Margaret Burke

[57] ABSTRACT

When an intensity modulating operation and a phase modulating operation are carried out by employing a 2-electrode MachZehnder type optical modulator preferably a LN-MZ type optical modulator, a drive signal of this 2-electrode LN-MZ type optical modulator is produced from an intensity modulation signal and a phase modulation signal with a low loss and a simple arrangement. A optical modulating apparatus includes a splitter/combiner structured to split an intensity modulation signal inputted into a first input terminal into a first electric signal having an in-phase relationship with that of the intensity modulation signal and second electric signal having an inverse phase relationship therewith, split a phase modulation signal inputted into a second input terminal into a third electric signal having an in-phase relationship with that of the phase modulation signal an also a fourth electric signal having an in-phase relationship therewith, combine the first electric signal with the fourth electric signal to thereby output a first combined signal, and combine the second electric signal with the third electric signal to thereby output a second combined signal; and an optical modulating means structured to split a light carrier wave entered from a light source into two light carrier waves, and to optically modulate the two sets of the split light carrier waves by using the first combined signal and the second combined signal derived from the splitter/combiner, and combine the two phase-modulated above said light carrier waves to output an optical modulation signal.

12 Claims, 3 Drawing Sheets

OPTICAL MODULATING APPARATUS

BACKGROUND OF THE INVENTION

1. Field of the Invention

The present invention is related to an optical modulating apparatus for intensity/phase-modulating an optical signal in a batch mode by driving a phase-modulating electric signal and an intensity-modulating electric signal.

2. Description of the Related Art

In conventional optical modulating apparatuses, the direct modulating system has been utilized in which a semiconductor laser is modulated by the drive current to produce an optical intensity signal directly proportional to the electric signal. However, in long-distance/wide-range optical transmission systems capable of transmitting optical signals over several thousands Km at transmission speed of several Gbp, or higher, optical modulation waveforms are largely deformed due to the chirping phenomenon, and the wavelength dispersion and the non-linear characteristic of the transmission path, so that the resulting transmission capacity is limited. In this chirping phenomenon, the wavelength of light is changed during the direct modulation.

On the other hand, since the chirping phenomenon is very little and the operation range higher than 10 GHz can be relatively simply achieved in the external modulating system, this external modulating system starts to be applied to large-capacity optical communication systems. Furthermore, in order to minimize deterioration in light waveforms after light signals have been transferred over long distances, optical phase modulation is intentionally superimposed on optical intensity modulation.

As the typical external modulator, a lithiumNiobate (LiNbO$_3$)-MachZehnder type optical modulator (will be referred to as an "LN-MZ type optical modulator" hereinafter) is known which is a type of MachZehnder type optical modulator.

An LN-MZ type optical modulator is operated as follows. An input optical signal is split into two optical signals inside this LN-MZ type optical modulator. While a phase modulation region is provided in both or either one of the two split optical signals, a phase of light to be transmitted is changed, and thereafter the phase-changed optical signals are again synthesized with each other. Then, the synthesized optical signal is outputted.

A phase adjustment is performed by way of a phase modulation by the electrooptic effect. Depending upon the phase change in the light in the phase modulation region, the interference conditions of the light are changed when the light signals are synthesized with each other at the post stage, and both the intensity and the phase of the light can be modulated. In such a case where phase modulations are provided in both of the two branch paths (two electrodes), both the intensity and the phase of the output light can arbitrarily be changed.

Now, a description will be made of operations of an LN-MZ type optical modulator having two electrodes. Assuming now that an electric field of input light is Ei(t); a field strength is A; modulation signals inputted into electrodes of a phase adjustment region are S1(t) and S2(t); DC bias voltages applied to electrodes in the respective branch paths are Vb1 and Vb2; and an angular velocity of light is "ω", an electric field Eo(t) after the light signals are combined with each other is expressed by the following formula (1):

$$Ei(t) = A \cdot \exp(i \cdot \omega \cdot t) \tag{1}$$

$$Eo(t) = A \cdot \exp\{i \cdot (\omega \cdot t + \alpha)\} \cdot$$

$$[\exp\{i \cdot \beta \cdot (S1(t) + Vb1)\} + \exp\{i \cdot \beta \cdot (S2(t) + Vb2)\}]/2$$

$$= [\exp\{i \cdot \beta \cdot (S1(t) + Vb1)\} + \exp\{i \cdot \beta \cdot (S2(t) + Vb2)\}]/2 \cdot$$

$$Ei(t) \cdot \exp\{i\alpha\}$$

In this formula (1), symbol "α" shows a fixed phase change amount in the phase modulation region; and symbol "β" represents a sensitivity of a phase modulation with respect to the input signal. It is assumed that "α" and "β" in each of the 2-split phase adjustment regions are equal to each other. Also, symbol "exp(iα)" shows a fixed phase delay of a modulator, and is a constant.

Now, when the modulation signals S1 and S2 are defined by the following formula (2), the electric field Eo(t) may be summarized by the following formula (3):

$$S1(t)=P(t)+A(t),$$

$$S2(t)=P(t)-A(t) \tag{2}$$

$$Eo(t)=\exp\{i \cdot \beta \cdot (P(t)+(Vb1+Vb2)/2)\} \cdot \cos\{\beta \cdot (A(t)+(Vb1-Vb2)/2)\} \cdot Ei(t) \cdot \exp\{i\alpha\} \tag{3}$$

A first item of a right hand in the above-described formula (3) indicates an item for representing a phase modulating component by P(t), and a second item of the right hand thereof is an item indicative of an intensity modulation component by A(t). It can be seen that the phase modulating operation and the intensity modulating operation are independently carried out by P(t) and A(t).

As previously explained, if the 2-electrode LN-MZ type optical modulator is used, both the phase modulating operation and the intensity modulating operation can be simultaneously achieved. To achieve an arbitrary phase modulation and an arbitrary intensity modulation, such a signal converter is required which may convert the phase modulation signal P(t) and the intensity modulation signal A(t) into an electric signal S1(t) and an electric signal S2(t), which are applied to an optical modulator.

As such a signal converting means, for instance, one signal converting means is described in IEEE Journal of Selected Topics in Quantum Electronics, Vol.2, No.2, JUNE 1996, P300–P310, "Pulse Generation for Soliton Systems Using Lithium Niobate Modulators"

FIG. 3 is a schematic block diagram in which the structural diagram of the signal converting means described in the above-described reference document is modified. In FIG. 3, reference numeral 1 shows a 2-electrode LN-MZ type optical modulator, reference numerals 2 and 3 indicate 3-dB splitters for splitting an electric signal into two electric signals, and reference numerals 4 and 5 show phase shifters for adjusting a phase of an electric signal. Reference numerals 6 and 7 indicate combiners for combining two electric signals with each other, reference numerals 8 and 9 are terminating devices for terminating an electric signal so as to prevent this electric signal from being reflected, and reference numeral 15 shows a light source for outputting light having constant intensity to be entered into the optical modulator 1. For the sake of simple explanations, it is assumed that a delayed length of each of connection lines is 0, and a loss of each of blocks is 0.

Next, operation will now be explained. This signal converting means of the above-described reference document is directed to such a signal converting operation that both the phase modulating operation directly proportional to P'(t) and the intensity modulating operation directly proportional to cos{K A'(t)}(symbol K being constant) are simultaneously performed by using the phase modulation signal P'(t) and the intensity modulation signal A'(t).

The voltage amplitude of the intensity modulation signal A'(t) inputted into the 3-dB splitter 2 is attenuated to $2^{-\frac{1}{2}}$, and the attenuated intensity modulation signal A'(t) is split into two sets of intensity modulation signals having the in-phases with respect to that of the inputted intensity modulation signal to become $2^{-\frac{1}{2}}$A'(t). In one path, this intensity modulation signal is delayed by the phase of "π" by the phase shifter 4, so that a signal of $-2^{-\frac{1}{2}}$·A'(t) is inputted into the combiner 6. In the other path, such a signal of $2^{-\frac{1}{2}}$·A'(t) is inputted into the combiner 7.

On the other hand, similarly, the voltage amplitude of the phase modulation signal P'(t) inputted into the 3-dB splitter 3 is attenuated to $2^{-\frac{1}{2}}$, and the attenuated phase modulation signal P'(t) is split into two sets of intensity modulation signals having the in-phases with respect to that of the inputted intensity modulation signal to become $2^{-\frac{1}{2}}$·P'(t). In one path, this phase modulation signal of $2^{-\frac{1}{2}}$·P'(t) is directly inputted into the combiner 6. In the phase shifter 5 of the other path, the phase fluctuation is adjusted (namely, phase change is set to 0), so that such a signal of $-2^{-\frac{1}{2}}$·P'(t) is inputted into the combiner 7.

Since the voltage values of two sets of the input signals whose amplitudes have been attenuated to $2^{-\frac{1}{2}}$ and thereafter added to each other are outputted from the combiners 6 and 7, the output signal S1(t) from the combiner 6 and the output signal S2(t) from the combiner 7 are expressed by the following formulae (4) and (5):

$$S1(t) = \frac{1}{2} \cdot A'(t) + \frac{1}{2} \cdot P'(t) \quad (4),$$

$$S2(t) = -\frac{1}{2} \cdot A'(t) + \frac{1}{2} \cdot P'(t) \quad (5).$$

Paying attention to such a conversion from A'(t) and P'(t) into S1(t) and S2(t) in the above-described formulae, it may be seen that the amplitude of the voltage inputted into the splitter is attenuated to ½(=−6 dB) at the output point from the combiner.

The above-described prior art discloses such a technique that the electric signals S1(t) and S2(t) which are applied to the two electrodes of the optical modulator 1 are produced from the phase modulation signal P'(t) and the intensity modulation signal A'(t) by employing the 3-dB splitter, the phase shifter, and the combiner when both the phase modulating operation and the intensity modulating operation are simultaneously carried out by the 2-electrode MZ-LN type optical modulator.

However, since a loss occurred in the 3-dB splitters and the combiners become −3 dB (total amount of loss is −6 db, namely, a half of voltage), an amplifier having a large output gain is required. On the other hand, as to a high output power/wide-band amplifier operable in high-speed optical communications at frequencies higher than several GHz, as the output power of this amplifier is increased, there arise various problems in view of heat dissipation, cost, and reliability of this high output power/wide-band amplifier. As a result, it is very important to reduce the output level of such an amplifier.

Furthermore, since the total numbers of components constituting the 3-dB splitters and the combiners are very large, the packaging scale thereof is increased and therefore the adjustment is required in the connection length of these components. In the case where as a phase shifter for adjusting a phase of a high frequency electric signal, a variable delay line is used in which a length of a coaxial line is varied, an amount of phase change caused by changing the same coaxial length becomes different, depending upon a frequency. As a consequence, there is such a drawback that the phase shift amount of the phase shifter must be readjusted with respect to each of the operation frequencies when the sinusoidal wave modulation is carried out.

Also, assuming now that the intensity modulating operation is performed by such a wave having a plurality of frequency components other than a sinusoidal wave, since the phase shift of "π" must be applied to all of the frequency components, the phase shifter cannot be constituted by employing the variable delay line. Therefore, such a phase shifting means as a 180-degree hybrid circuit is required by which a 180-degree phase shift can be made as to all of frequencies within a signal band.

SUMMARY OF THE INVENTION

The present invention has been made to solve the above-explained problems, and therefore, has an object to provide such an optical modulating apparatus capable of combining an intensity modulation signal with a phase modulation signal by employing a simple structure with a low loss to finally produce a drive signal suitably driving an optical modulating device.

An optical modulating apparatus, according to a first aspect of the present invention, is featured by comprising: a splitter/combiner structured to split an electric intensity modulation signal inputted into a first input terminal into a first electric signal having an in-phase relationship with that of said intensity modulation signal and also a second electric signal having an inverse phase relationship, therewith split an electric phase modulation signal inputted into a second input terminal into a third electric signal having an in-phase relationship with that of said phase modulation signal and also a fourth electric signal having an in-phase relationship therewith, combine said first electric signal with said fourth electric signal to thereby output a first combined signal, and combine said second electric signal with said third electric signal to thereby output a second combined signal; and an optical modulator structured to split a light carrier wave entered from a light source into two light carrier waves, optically phase modulate said two sets of the split light carrier waves by using said first combined signal and said second combined signal derived from said splitting/combining means, and combine the two phase-modulated above said light carrier waves into output an optical modulation signal.

Also, an optical modulating apparatus, according to a second aspect of the present invention, is featured by comprising: splitter/combiner structured to split an electric intensity modulation signal inputted into a first input terminal into a first electric signal having an in-phase relationship with that of said intensity modulation signal and also a second electric signal having a −90 degree phase relationship therewith, split an electric phase modulation signal inputted into a second input terminal into a third electric signal having an in-phase relationship with that of said phase modulation signal and also a fourth electric signal having a −90 degree phase relationship therewith, combining said first electric signal with said fourth electric signal to thereby output a first combined signal, and combine said second electric signal with said third electric signal to thereby output a second combined signal; a shifter structured to shift a phase of said second combined signal derived from said splitting/combining means by −90 degrees to output the phase-shifted second combined signal as a third combined signal; and a optical modulator structured to shift a light carrier wave entered from a light source into two light carrier waves, optically phase modulate said two sets of the split light carrier waves by using said first combined signal derived from said splitting/combining means and also said third combined signal derived from said shifting means, and combine the two phase-modulated above said light carrier waves into output an optical modulation signal.

BRIEF DESCRIPTION OF THE DRAWINGS

For a more better understanding of the present invention, reference is made of a detailed description to be read in conjunction with the accompanying drawings, in which.

DESCRIPTION OF THE PREFERRED EMBODIMENTS

EMBODIMENT 1

In accordance with this embodiment 1, an intensity/phase-modulating operation is carried out in a batch mode by utilizing a 180-degree hybrid circuit and an optical modulator.

Figure 1:
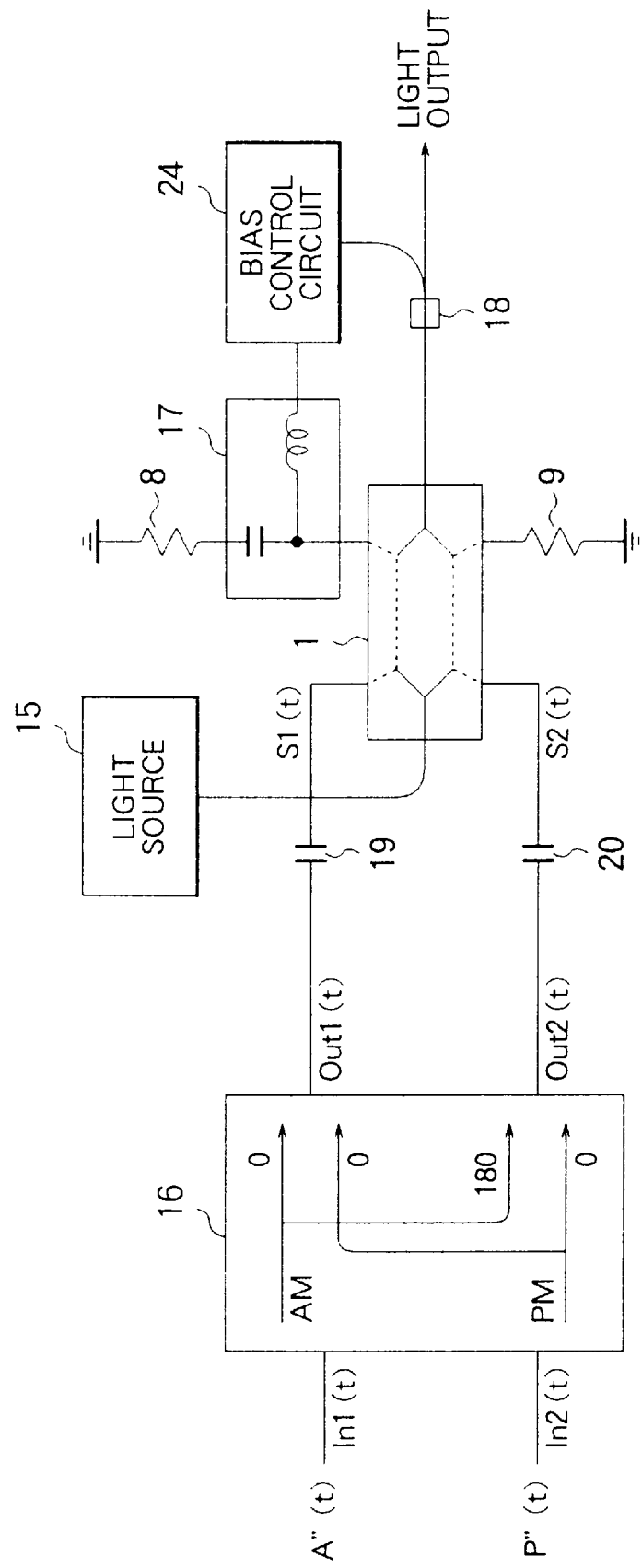
FIG. 1 schematically shows a basic arrangement of an optical modulating apparatus according to a first embodiment of the present invention.

FIG. 1 is a structural diagram of an optical modulating apparatus according to this embodiment of the present invention. In FIG. 1, reference numeral 1 indicates 2-electrode LN-MZ type optical modulator, reference numerals 8 and 9 denote terminating devices for terminating an optical signal so as to prevent reflections of electric signals, and reference numeral 15 shows a light source for outputting light having constant intensity to the optical modulator 1.

Furthermore, in this drawing, reference numeral 16 represents a 180-degree hybrid circuit for synthesizing an intensity modulation signal and a phase modulation signal to output a synthesized signal. Reference numeral 17 shows a bias T for applying a bias voltage to the optical modulator 1. Reference numeral 18 is a photocoupler for splitting a portion of an optical signal in order to monitor the optical signal outputted from the optical modulator 1. Reference numerals 19 and 20 indicate capacitors used to cut a DC voltage component. Reference numeral 24 is a bias control circuit for producing a proper bias voltage by monitoring a modulated optical output to apply this proper bias voltage to the bias T 17.

Next, an operation of the optical modulator will now be explained. An object of this optical modulator according to this embodiment 1 is to perform a phase modulation directly proportional to $P''(t)$ and an intensity modulation directly proportional to $\cos\{K\,A''(t)\}$ (symbol K being constant) at the same time by using a phase modulation signal $P''(t)$ and an intensity modulation signal $A''(t)$.

The 180-degree hybrid circuit 16 is a 2-input/2-output passive circuit. Under such an ideal condition that no excess loss is considered, a relational formula among an input signal $In1(t)$, an input signal $In2(t)$, an output signal $Out1(t)$, and an output signal $Out2(t)$ is expressed by the following formula (6):

$$Out1(t)=1/\sqrt{2}\cdot In1(t)+1/\sqrt{2}\cdot In2(t)$$

$$Out2(t)=-1/\sqrt{2}\cdot In1(t)+1/\sqrt{2}\cdot In2(t) \qquad (6).$$

In other words, the input signal $In1(t)$ is split into a signal $2^{-1/2}\cdot In1(t)$ having an in-phase with that of the input signal, and another signal $-2^{-1/2}\cdot In1(t)$ having an inverse phase therewith by the 180-degree hybrid circuit 16. The input signal $In2(t)$ is split into signal $2^{-1/2}\cdot In2(t)$ having an in-phase with that of the input signal $In2(t)$ and a signal $2^{-1/2}\cdot In2(t)$ having an in-phase therewith by the 180-degree hybrid circuit 16.

Then, the output signal $Out1(t)$ is outputted by synthesizing the signal $2^{-1/2}\cdot In1(t)$ having the in-phase with the signal $2^{-1/2}\cdot In2(t)$ having the in-phase, and the output signal $Out2(t)$ is outputted by synthesizing the signal $-2^{1/2}\cdot In1(t)$ having the inverse phase with the signal $2^{-1/2}\cdot In2(t)$ having the in-phase by the 180-degree hybrid circuit 16.

Such a 180-degree hybrid circuit 16 for splitting/combining the signals is readily commercially available as a 180-degree hybrid circuit having a small excess loss and also a wide operation frequency (for example, several GHz to 20 GHz).

When the intensity modulation signal $A''(t)$ is inputted into $In1(t)$ of the 180-degree hybrid circuit 16 and the phase modulation signal $P'(t)$ is inputted into $In2(t)$, the output signal $Out1(t)$ and the output signal $Out2(t)$ are expressed by the following formula (7):

$$Out1(t)=1/\sqrt{2}\cdot A''(t)+1/\sqrt{2}\cdot P''(t)$$

$$Out2(t)=-1/\sqrt{2}\cdot A''(t)+1/\sqrt{2}\cdot P''(t) \qquad (7).$$

When these output signals $Out1(t)$ and $Out2(t)$ are inputted via the capacitors 19 and 20 into the optical modulator 1 as drive signals $S1(t)$ and $S2(t)$ with keeping the same electric connection lengths, this optical modulator 1 splits a light carrier wave originated from the light source 5 into two light waves, and optical-modulates these two split light waves based upon the drive signals $S1(t)$ and $S2(t)$. Thereafter, this optical modulator 1 combines two sets of the modulated light carrier waves to thereby output an optical modulation signal which is intensity-modulated by the intensity modulation signal $2^{-1/2}\cdot A''(t)$, and another optical modulation signal which is phase-modulated by the phase modulation signal $2^{-1/2}\cdot P''(t)$. Now, paying attention to such a fact that the phase modulation signal $P''(t)$ and the intensity modulation signal $A''(t)$ are converted into the drive signals $S1(t)$ and $S2(t)$, the amplitudes of the signals inputted into the 180-degree hybrid circuit 16 are attenuated to $2^{-1/2}(=-3$ dB) at the output point. This loss is smaller than the loss (namely $-6$ dB) of the conventional optical modulator by 3 dB.

The modulation signals S1 and S2 are terminated in the terminating devices 8 and 9, respectively, and therefore, are not reflected. The bias voltages are applied from the output terminals of the optical modulator 1 to the respective electrodes of the optical modulator 1. A voltage derived from the bias control circuit 24 is applied via the bias T17 to one electrode of the optical modulator 1, and a GND potential is applied via the terminating device 9 to the other electrode thereof. These bias voltages are insulated from the previous portions thereof by the capacitors 19 and 20.

It should be noted that as the optical signal inputted from the light source 15 into the optical modulator 1, either direct light (non-modulated light) or an optical signal on which data has been modulated. The optical signal inputted into the optical modulator 1 is superimposed by the intensity modulation and the phase modulation by using the drive signals S1(t) and S2(t), and then the intensity/phase-modulated signals are outputted. Since the intensity-modulated signal wave is greatly changed by the bias voltages applied to the respective electrodes, the bias voltages are required to be optimized. A portion of the optical signal outputted from the optical modulator 1 is split by the photocoupler 18, and the split optical signal is monitored by the bias control circuit 24.

The bias control circuit 24 may produce optimum bias voltage values in such a manner that, for example, a bias voltage is varied in a low frequency with a very low amplitude, and peak intensity of non-modulated light which is changed in response to the changed bias voltage is monitored so as to detect a phase relationship between the bias variation and a change in the peak intensity.

In other words, in this embodiment 1, since the intensity modulation signal and the phase modulation signal are inputted via the separately provided input terminals into the optical modulator, the optical input signal can be intensity/phase-modulated in a batch mode.

As previously described, the conventional method with employment of the 3-dB splitter, the phase shifter, and the combiner bears the loss of −6 dB when the input/output signals are converted.

In comparison with this conventional method, since the splitting/combining means of the 180-degree hybrid circuit 16 is employed and thus the input/output signal can be converted with the loss of −3 dB, the equivalent modulation to the prior art can be carried out by merely using a smaller input signal than that of the prior art. As a consequence, an output of an electric amplifier used when an input signal is produced can be reduced, so that power consumption and cost of the optical modulator can be reduced, and the reliability of this optical modulator can be improved.

Also, since the conventional splitting/combining function for the signal, which is realized by employing two sets of the 3-dB splitters, two sets of the phase shifters, and two sets of the combiners, is replaced by a single set of the above explained 180-degree hybrid circuit 16, the packing scale of this splitting/combining function can be made small and adjustment of connection length is not necessary.

Furthermore, since the phase relationship between the input signal and the output signal with respect to all of the frequencies can be maintained in operation band of the 180-degree hybrid circuit 16, the desirable modulation characteristics with respect to the signal having a plurality of frequency components can be realized. As to such a signal having a single frequency component, when the operation frequency is changed, there is no need to change a arrangement of the apparatus.

EMBODIMENT 2

In accordance with this embodiment 2, an intensity/phase-modulating operation is carried out in a batch mode by using a 90-degree hybrid circuit and an optical modulator.

Figure 2:
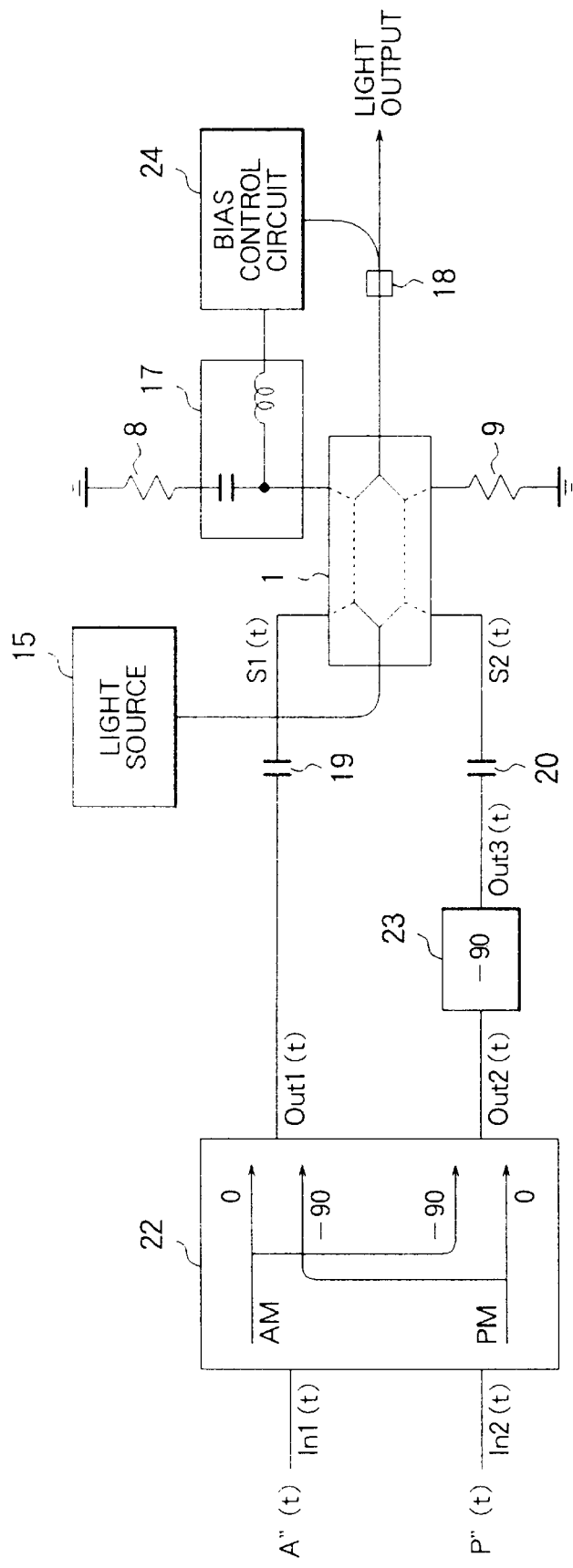
FIG. 2 schematically shows a basic arrangement of an optical modulating apparatus according to a second embodiment of the present invention.
Figure 3:
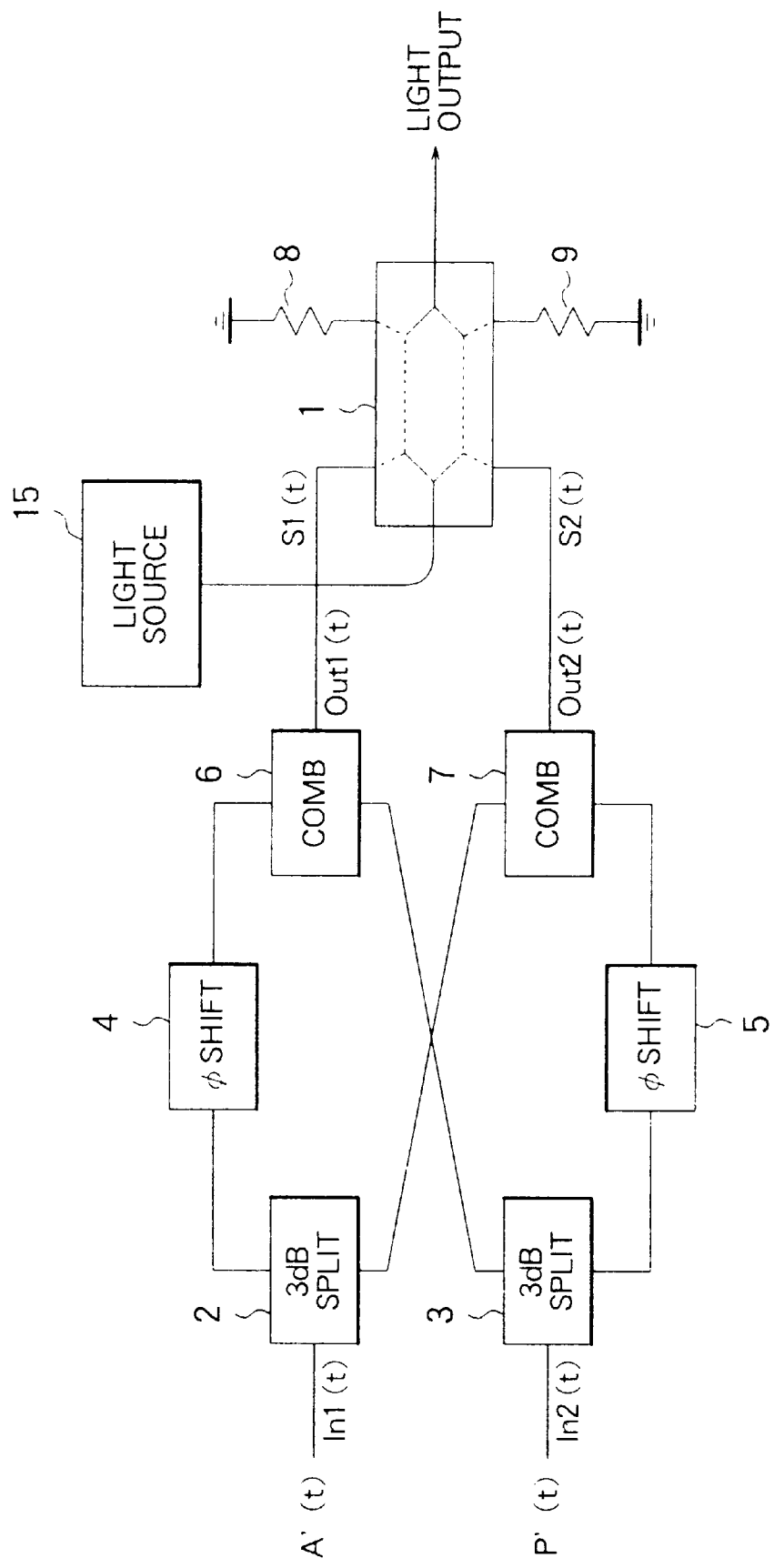
FIG. 3 is a schematic diagram for showing the basic arrangement of the conventional optical modulating apparatus.

FIG. 2 is a structural diagram of an optical modulating apparatus according to this embodiment of the present invention. In FIG. 2, reference numeral 22 shows a 90-degree hybrid circuit for combining an intensity modulation signal with a phase modulation signal to output a synthesized signal. Reference numeral 23 is a phase shifter for applying a 90-degree phase shift to a signal. Since other optical components are similar to those of FIG. 1, explanations thereof are omitted.

Next, an operation of the optical modulator will now be explained. An object of this optical modulator according to this embodiment 2 is to perform a phase modulation directly proportional to $i \cdot P''(t)$ and an intensity modulation directly proportional to $\cos\{K \cdot A''(t)\}$ (symbol K being constant) at the same time by using a phase modulation signal $P''(t)$ and an intensity modulation signal $A''(t)$. It should be noted that symbol "i" indicates an imaginary number, and implies a phase (shift) of −90 degrees.

The 90-degree hybrid circuit 22 is a 2-input/2-output passive circuit. Under such an ideal condition that no excess loss is considered, a relational formula among an input signal In1(t), an input signal In2(t), an output signal Out1(t), and an output signal Out2(t) is expressed by the following formula (8):

$$Out1(t)=1/\sqrt{2} \cdot In1(t) - i/\sqrt{2} \cdot In2(t)$$

$$Out2(t)=-i/\sqrt{2} \cdot In1(t)+1/\sqrt{2} \cdot In2(t) \qquad (8).$$

In other words, the input signal In1(t) is split into a signal $2^{-\frac{1}{2}} \cdot In1(t)$ having an in-phase with that of the input signal, and another signal $(-i)2^{-\frac{1}{2}} \cdot In1(t)$ having a −90 degree phase therewith by the 90-degree hybrid circuit 22. The input signal In2(t) is split into a signal $(-i)2^{-\frac{1}{2}} \cdot In2(t)$ having a −90 degree phase therewith and a signal $2^{-\frac{1}{2}} \cdot In2(t)$ having an in-phase therewith by the 90-degree hybrid circuit 22.

Then, the output signal Out1(t) is outputted by combining the signal $2^{-\frac{1}{2}} \cdot In1(t)$ having the in-phase with the signal $(-i)2^{-\frac{1}{2}} \cdot In2(t)$ having the −90 degree phase, and the output signal Out2(t) is outputted by combining the signal $(-i)2^{-\frac{1}{2}} \cdot In1(t)$ having the −90 degree phase with the signal $2^{-\frac{1}{2}} \cdot In2(t)$ having the in-phase by the 90-degree hybrid circuit 22.

Such a 90-degree hybrid circuit 22 for splitting/combining the signals is readily commercially available as a 90-degree hybrid circuit having a small excess loss and also a wide operation frequency (for example, several GHZ to 20 GHz).

When the intensity modulation signal $A''(t)$ is inputted into In1(t) of the 90-degree hybrid circuit 22 and the phase modulation signal $P''(t)$ is inputted into In2(t) thereof, the output signal Out1(t) and the output signal Out2(t) are expressed by the following formula (9):

$$Out1(t)=1/\sqrt{2} \cdot A''(t) + -i/\sqrt{2} \cdot P''(t)$$

$$Out2(t)=-i/\sqrt{2} \cdot A''(t)+1/\sqrt{2} \cdot P''(t) \qquad (9)$$

When the output signal Out2(t) is inputted into the phase shifter 23 for producing the phase shift by −90 degrees, an output signal Out3(t) of this phase shifter 23 is expressed by the following formula (10):

$$Out3(t) = i \cdot \{-i/\sqrt{2} \cdot A''(t) + 1/\sqrt{2} \cdot P''(t)\} \qquad (10)$$

$$= 1/\sqrt{2} \cdot A''(t) + i/\sqrt{2} \cdot P''(t).$$

The phase shifter 23 may be realized by using such a phase shifter operable in a wide frequency range, or another phase shifter such that when this phase shifter may be operated only in a single frequency, a connection line length thereof is merely made longer by a ¼-wavelength.

In the case where both the intensity modulation signal and the phase modulation signal are made of a single frequency, and also the phase shifter 23 is arranged by a variable delay line, this phase shifter 23 may be operated under various operation frequencies by changing the delay length of the variable delay line to a ¼-wavelength of an operation frequency.

When these output signals Out1(t) and Out3(t) are inputted via the capacitors 19 and 20 into the optical modulator 1 as drive signals S1(t) and S2(t) with keeping the same electric connection lengths, this optical modulator 1 splits a light carrier wave originated from the light source 15 into two light waves, and optically modulates these two split light waves based upon the drive signals S1(t) and S2(t). Thereafter, this optical modulator 1 combines two sets of the modulated light carrier waves to thereby output an optical modulation signal which is intensity-modulated by the intensity modulation signal $2^{-\frac{1}{2}} \cdot A"(t)$, and another optical modulation signal which is phase-modulated by the phase modulation signal $2^{-\frac{1}{2}} \cdot P"(t)$.

Now, paying attention to such a fact that the phase modulation signal P"(t) and the intensity modulation signal A"(t) are converted into the drive signals S1(t) and S2(t), it is found that the amplitudes of the signals inputted into the 90-degree hybrid circuit 22 are attenuated to $2^{-\frac{1}{2}}(=-3$ dB) at the output point. This loss is smaller than the loss (namely −6 dB) of the conventional optical modulator by 3 dB. It should be understood that applications of bias voltages and controls of these bias voltages in this embodiment 2 are similar to those of the embodiment 1.

In other words, in this embodiment 2 of the present invention, since an intensity modulation signal and a phase modulation signal are inputted from the respective input terminals, intensity and phase modulations can be performed in a batch mode to a optical signal.

As previously described, the conventional method with employment of the 3-dB splitter, the phase shifter, and the combiner bears the loss of −6 dB when the input/output signals are converted. In comparison with this conventional method, since the splitting/combining means of the 90-degree hybrid circuit 22 is employed and thus the input/output signal can be converted with the loss of −3 dB, the equivalent modulation to the prior art can be carried out by merely using a smaller input signal than that of the prior art. As a consequence, an output of an electric amplifier used when an input signal is produced can be reduced, so that power consumption and cost of the optical modulator can be reduced, and the reliability of this optical modulator can be improved.

Also, since the conventional splitting/combining function for the signal, which is realized by employing two sets of the 3-dB splitters, two sets of the phase shifters, and two sets of the combiners, is replaced by a single set of the above-explained 90-degree hybrid circuit 16, and the phase shifter 23 the packaging scale of this splitting/combining function can be made small.

What is claimed is:

1. An optical modulating apparatus comprising: a splitter/combiner structured to split an electric intensity modulation signal inputted into a first input terminal into a first electric signal having an in-phase relationship with that of said intensity modulation signal and also a second electric signal having an inverse phase relationship therewith, split an electric phase modulation signal inputted into a second input terminal into a third electric signal having an in-phase relationship with that of said phase modulation signal and also a fourth electric signal having an in-phase relationship therewith, combine said first electric signal with said fourth electric signal to thereby output a first combined signal, and combine said second electric signal with said third electric signal to thereby output a second combined signal; and an optical modulator structured to splitting a light carrier wave entered from a light source into two light carrier waves, optically phase modulate said two sets of the split light carrier waves by using said first combined signal and said second combined signal derived from said splitter/combiner, and combine the two phase-modulated above said light carrier waves to output an optical modulation signal.

2. An optical modulating apparatus as claimed in claim 1 wherein;

said splitter/combiner is a 180-degree hybrid circuit; and said optical modulator is a multi-electrode MachZehnder type optical modulator.

3. An optical modulating apparatus as claimed in claim 2, further comprising:

a bias control circuit for producing a proper bias voltage based upon monitored optical modulation signal, and a bias T for applying said produced bias voltage to said multi-electrode MachZehnder type optical modulator.

4. An optical modulating apparatus as claimed in claim 3, further comprising:

a first capacitor for cutting a DC voltage component from said first combined signal outputted from said 180-degree hybrid circuit to supply the DC-component-cut first combined signal to said multi-electrode MachZehnder type optical modulator.

5. An optical modulating apparatus as claimed in claim 4, further comprising:

a photocoupler for splitting a portion of the optical modulation signal outputted from said multi-electrode MachZehnder type optical modulator.

6. An optical modulating apparatus comprising:

a splitter/combiner structured to split an electric intensity modulation signal inputted into a first input terminal into a first electric signal having an in-phase relationship with that of said intensity modulation signal and also a second electric signal having a 90 degree phase relationship therewith, split an electric phase modulation signal inputted into a second input terminal into a third electric signal having an in-phase relationship with that of said phase modulation signal and also a fourth electric signal having a −90 degree phase relationship therewith, combine said first electric signal with said fourth electric signal to thereby output a first combined signal, and combine said second electric signal with said third electric signal to thereby output a second combined signal;

a shifter structured to shift a a phase of said second combined signal derived from said splitter/combiner by −90 degrees to output the phase-shifted second combined signal as a third combined signal; and an optical modulator structured to split a light carrier wave entered from a light source into two light carrier waves, optically phase modulate said two sets of the split light carrier waves by using said first combined signal derived from said splitter/combiner, and also said third combined signal derived from said shifter, and combine the two phase-modulated said light carrier waves to output an optical modulation signal.

7. An optical modulating apparatus as claimed in claim 6 wherein:

said splitter/combiner is a 90-degree hybrid circuit;

said shifter is a phase shifter; and said optical modulator is a multi-electrode MachZehnder type optical modulator.

8. An optical modulating apparatus as claimed in claim 7, further comprising:

a bias control circuit for producing a proper bias voltage based upon monitored optical modulation signal; and a bias T for applying said produced bias voltage to said multi-electrode MachZehnder type optical modulator.

9. An optical modulating apparatus as claimed in claim 8, further comprising:

a first capacitor for cutting a DC voltage component from said first combined signal outputted from said 90-degree hybrid circuit to supply to DC-component-cut first combined signal to said multi-electrode MachZehnder type optical modulator; and a second capacitor for cutting a DC voltage component from said third combined signal outputted from said phase shifter to supply the DC-component-cut third combined signal to said multi-electrode MachZehnder type optical modulator.

10. An optical modulating apparatus as claimed in claim 9, further comprising:

a photocoupler for splitting a portion of the optical modulation signal outputted from said multi-electrode MachZehnder type optical modulator so as to monitor said optical modulation signal.

11. The optical modulating apparatus of claim 2 wherein said optical modulator is a multi-electrode LN-MZ type optical modulator.

12. The optical modulating apparatus of claim 7 wherein said optical modulator is a multi-electrode LN-MZ type optical modulator.

* * * * *

UNITED STATES PATENT AND TRADEMARK OFFICE
CERTIFICATE OF CORRECTION

PATENT NO. : 6,028,695
DATED : February 22, 2000
INVENTOR(S) : Uemura et al.

It is certified that error appears in the above-identified patent and that said Letters Patent is hereby corrected as shown below:

<u>Title page,</u>
Item [73], Assignee, should read as follows:
-- Mitsubishi Denki Kabushiki Kaisha
  Kokusai Denshin Denwa Co., Ltd. --

Signed and Sealed this

Twenty-sixth Day of October, 2004

JON W. DUDAS
*Director of the United States Patent and Trademark Office*